(12) United States Patent
Reiss, Jr.

(10) Patent No.: US 9,539,528 B2
(45) Date of Patent: Jan. 10, 2017

(54) RACK AND PINION DRIVE FOR TRASH RAKE

(75) Inventor: Thomas J. Reiss, Jr., Ixonia, WI (US)

(73) Assignee: Hydro Component Systems, LLC, Watertown, WI (US)

( * ) Notice: Subject to any disclaimer, the term of this patent is extended or adjusted under 35 U.S.C. 154(b) by 418 days.

(21) Appl. No.: 13/546,783

(22) Filed: Jul. 11, 2012

(65) Prior Publication Data
US 2013/0020264 A1 Jan. 24, 2013

Related U.S. Application Data

(60) Provisional application No. 61/508,728, filed on Jul. 18, 2011.

(51) Int. Cl.
| | | |
|---|---|---|
| *B01D 33/70* | (2006.01) | |
| *E02B 5/08* | (2006.01) | |
| *F16H 19/06* | (2006.01) | |
| *B01D 29/44* | (2006.01) | |
| *B01D 29/03* | (2006.01) | |
| *B01D 29/64* | (2006.01) | |
| *E02B 8/02* | (2006.01) | |

(52) U.S. Cl.
CPC ............ *B01D 29/445* (2013.01); *B01D 29/03* (2013.01); *B01D 29/6484* (2013.01); *E02B 8/026* (2013.01); *Y10T 74/18096* (2015.01)

(58) Field of Classification Search
CPC ... B01D 29/445; B01D 29/6484; E02B 8/026; B07B 1/526
USPC ............... 210/91, 154, 158, 159, 162, 396, 413,210/780, 783; 209/273, 379; 74/30; 340/850, 340/870
See application file for complete search history.

(56) References Cited

U.S. PATENT DOCUMENTS

| | | |
|---|---|---|
| 2,866,555 A | 12/1958 | Nordell |
| 3,193,104 A | 7/1965 | Leach |
| 3,482,698 A | 12/1969 | Ostnas |
| 3,909,411 A | 9/1975 | Angele et al. |
| 4,138,334 A | 2/1979 | Rimmele |
| 4,214,989 A * | 7/1980 | Rudolph ................ E02B 8/026 210/159 |

(Continued)

FOREIGN PATENT DOCUMENTS

| | | |
|---|---|---|
| KR | 20-0239062 | 10/2001 |
| KR | 20-0323134 | 8/2003 |
| KR | 10-0540219 | 1/2006 |

OTHER PUBLICATIONS

Wahl et al, "Trashrack Cleaning Alternatives for Parker Dam Powerplant Forebay Inlet Trashrack Structure" U.S. Department of the Interior, 2008, pp. 1-27.*

(Continued)

*Primary Examiner* — Nam Nguyen
*Assistant Examiner* — Claire Norris
(74) *Attorney, Agent, or Firm* — Reinhart Boerner Van Deuren P.C.

(57) ABSTRACT

There is disclosed a trash rake system for use in clearing debris from an intake screen of an intake trash rack of a water intake port of a water use facility. The intake screen is configured to collect debris transported by water, for example, a river, to prevent the debris from entering the intake port of the water use facility. The trash rake system includes a track system, a movable support structure, a rack and pinion drive mechanism, and a controller configured to receive signals from an encoder on a drive motor and a proximity sensor system.

23 Claims, 10 Drawing Sheets

(56) References Cited

U.S. PATENT DOCUMENTS

| | | | |
|---|---|---|---|
| 4,218,319 | A | 8/1980 | Hansson |
| 4,222,878 | A | 9/1980 | Hansson |
| 4,447,323 | A | 5/1984 | Jackson |
| 4,792,394 | A | 12/1988 | Rudzinski |
| 4,846,966 | A | 7/1989 | Pastore |
| 4,857,182 | A | 8/1989 | Jackson |
| 5,074,996 | A | 12/1991 | Galanty et al. |
| 5,098,561 | A | 3/1992 | Grabbe |
| 5,167,803 | A | 12/1992 | Newton et al. |
| 5,246,573 | A | 9/1993 | Lodholz et al. |
| 5,571,406 | A | 11/1996 | Mensching |
| 5,718,771 | A | 2/1998 | Cassell et al. |
| 5,968,350 | A | 10/1999 | Davignon |
| 6,016,920 | A | 1/2000 | Brauch et al. |
| 6,129,215 | A | 10/2000 | Brauch et al. |
| 7,194,330 | B2 * | 3/2007 | Carson .......................... 700/214 |
| 7,815,811 | B1 | 10/2010 | Reiss, Jr. |
| 2007/0125691 | A1 | 6/2007 | Reiss, Jr. |
| 2007/0187119 | A1 | 8/2007 | Fawcett |
| 2009/0095190 | A1 * | 4/2009 | Gordon ................... B25H 5/00 104/53 |

OTHER PUBLICATIONS

International Water Power, "Cleaning up—world's largest trash rack cleaning system" 2009, online access date Feb. 10, 2015, pp. 1-3.*

* cited by examiner

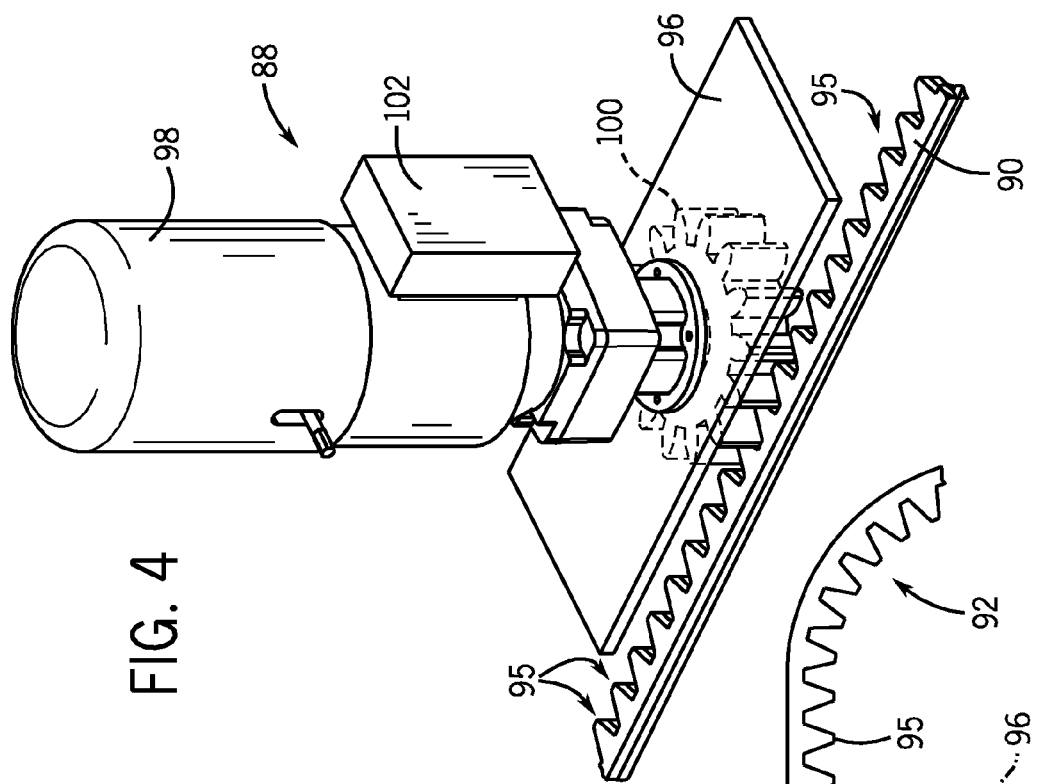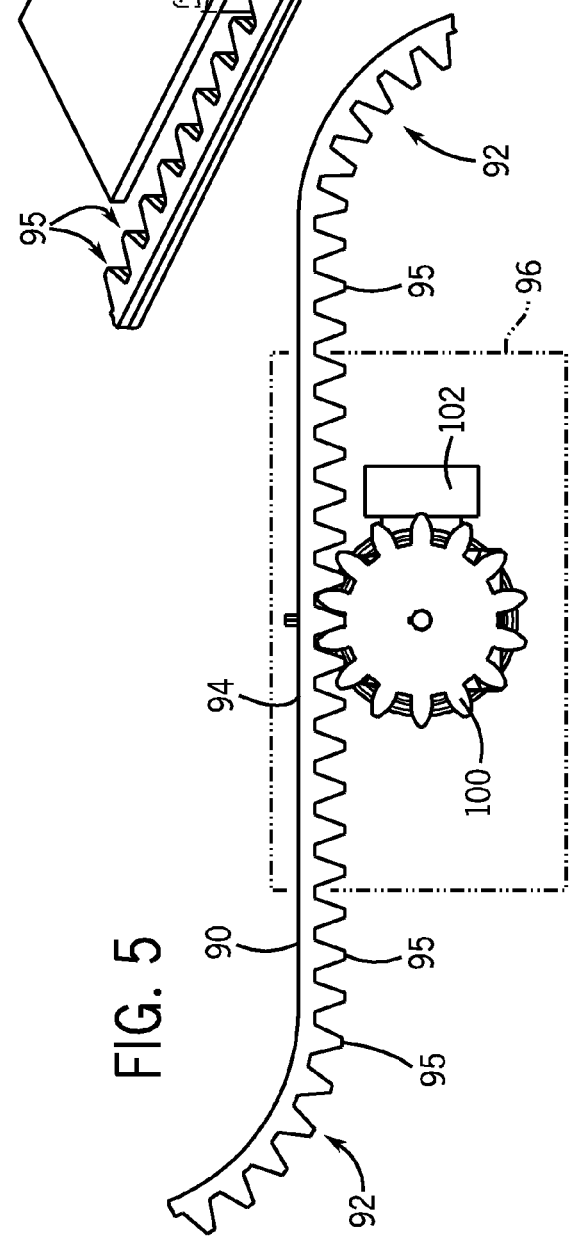

RACK AND PINION DRIVE FOR TRASH RAKE

CROSS-REFERENCE TO RELATED PATENT APPLICATIONS

This patent application claims priority to U.S. Provisional Application No. 61/508,728, filed Jul. 18, 2011, incorporated herein in its entirety, by this reference.

FIELD OF THE INVENTION

This invention pertains generally to trash rakes and other devices and systems for clearing debris from intake screens or racks that are used to prevent debris from entering into systems and facilities that intake water from exposed above-ground water sources such as rivers, lakes, oceans and the like.

BACKGROUND OF THE INVENTION

Various systems and facilities intake large quantities of water from various exposed natural and other above-ground water sources, such as rivers, lakes, oceans, reservoirs, irrigation and flood water canals, outdoor water parks, other water conveyance structures, and the like. Examples of such systems and facilities include hydroelectric plants, pulp and paper mills, steel mills, petro-chemical plants, municipal water systems and waste water plants, nuclear and other energy facilities that use the water for cooling or for other purposes, other water filtering or screening facilities, etc. In all such systems it is important to screen naturally occurring debris found in the exposed above-ground water source from the flow of water that is taken into and employed by the system or facility. Such debris may include, for example, leaves, branches, and other portions of trees or other plants that have fallen into or grown in the water source, trash, and other debris that has been dumped or otherwise found its way into the exposed above-ground water source, etc. Such debris could cause significant damage to the system or facility obtaining water from the exposed above-ground water source if it were allowed to enter into the system or facility.

Various screening systems are known and used for preventing debris found in exposed above-ground water sources from entering into the systems or facilities described above. For example, fine mesh screening may be used to exclude even small pieces of debris from such systems. Screening systems with larger openings may be used, either alone or in combination with finer screening, to prevent large debris from entering the system or facility taking water from the exposed above-ground water source. Such larger opening screening systems may be used for preventing large debris from reaching finer mesh screening positioned downstream from the larger opening screening. Larger opening screening systems preferably do not dramatically adversely affect the water flow volume provided into the facility or system through the screening system.

An exemplary screening system of this type is known as an intake rack system or trash rack. Intake rack systems typically provide screening using a series of vertically oriented parallel blades separated by spacers and mounted on horizontally oriented rods. The spacing between the blades forming the intake rack is selected to screen debris of the desired size from entering the water intake of the system or facility that the trash rack is protecting, without significantly reducing water flow into the water intake. Such intake racks may be made of metallic or non-metallic materials.

Intake racks of this type are available, for example, from Hydro Component Systems, LLC of Watertown, Wis. and covered by U.S. Pat. No. 7,815,811, incorporated herein, in full, by this reference. In a typical application, intake racks of this type may be mounted upstream from the water intake of a hydroelectric or other plant, system or facility that intakes water from a river or other similar exposed above-ground water source. The elongated vertically oriented parallel blades forming the intake rack extend downward into the water to prevent debris floating at the water surface or in the water below the water line from entering the system or facility.

As an intake rack or other screening structure prevents the flow of debris into the water intake of a system or facility from an exposed above-ground water source, the debris being screened will build up on the intake rack or other screening structure. This accumulating debris must be cleared from the intake rack or other screening structure on a regular basis, to prevent the buildup of such debris from interfering with the flow of water into the system or facility water intake.

A typical tool for removing accumulated debris from an intake rack is known as a trash rake. A typical trash rake can include a rake-like structure including tines that are spaced apart so as to fit between the blades of an intake rack to be cleaned. This rake-like structure is positioned adjacent to and drawn vertically along the intake rack blades to remove accumulated debris therefrom.

The debris cleared from the intake rack using such systems typically is dumped onto a deck or conveyor located at the top of the intake rack system to be hauled away to a nearby debris disposal location. Thus, an expensive and/or time consuming secondary system or process must be employed to haul away the debris that has been removed from an intake rack using such current systems. Current trash rake systems do not allow an operator under all operating conditions simply, easily, and effectively under full power to position a trash rake adjacent to an intake rack to be cleaned, especially if the disposed site is at an angle relative to the intake rake, and then to carry the removed debris to a desired disposal location adjacent to the intake rack without the use of a secondary system or process.

SUMMARY OF THE INVENTION

There is disclosed a trash rake system for use in clearing debris from an intake screen of an intake trash rack of a water intake port of a water use facility, for example a hydroelectric plant. The intake screen is configured to collect debris transported by water, for example, a river, to prevent the debris from entering the intake port of the water use facility.

The trash rake system includes a track system, a movable support structure including a trash rake apparatus, a drive mechanism, and a controller. The track system is positioned approximate a portion of the intake rake and aligned with the intake rack. The track system includes two parallel tracks, wherein a path of the track system includes at least one of a straight section and a curved section. The track typically extends along the full length of the intake trash rack and also provides a path to a trash deposit site. In one embodiment, the path curves away from the intake trash rack so that the debris recovered from the intake screen is deposited in, for example a trash container, or a down river location.

A movable support structure is configured to move on the track system, with the support system including the trash rake apparatus. The trash rake apparatus typically includes a telescopic boom and associated actuators to recover debris from the intake screen.

A drive mechanism for the support structure includes a drive bar, a drive motor, a drive pinion and an encoder coupled to the drive motor. The drive bar defines a plurality of teeth extending substantially along the length of the drive bar. The drive bar is disposed in an area defined by the parallel tracks and extends substantially parallel to the tracks. In other words, the drive bar follows the route of the track system with the drive bar between the two tracks of the track system.

The drive motor is disposed in the support structure and typically is coupled to a mounting platform attached to the support structure. A drive pinion is coupled to the drive motor. The drive pinion can be attached directly to the drive motor or it can be coupled to the drive motor through a gear train. The drive pinion is configured to rotably engage the teeth of the drive bar along the entire length of the drive bar. With the drive motor rotating the drive pinion the drive pinion moves along the drive bar and accordingly moves the support structure along the tracks. In another embodiment a cam follower coupled to the support structure is configured to apply a force against the drive bar opposite the drive pinion.

A controller is coupled to the drive motor and configured to selectively position the movable support structure along the path in response to a signal received from the encoder and a proximity sensor. The encoder is coupled to the drive motor and may include additional sensors for purposes of determining an exact location of the support structure and its associated trash rake apparatus. The trash rake apparatus is positioned, approximate the intake rack to remove debris from the intake screen. In one embodiment, the controller automatically controls all the operations of the trash rake system. In another embodiment, the operation of the track rake system is accomplished manually with a handheld controller.

There is further provided, a rack and pinion drive for a trash rake system. The trash rake system is used to clear debris from an intake screen of an intake trash rack of a water intake port of a water use facility. The intake screen is configured to collect debris transported by the water before the debris enters the intake port.

The trash rake system includes the track system having two parallel tracks including at least one of a straight section and a curved section. A movable support structure is configured to move on the track system with the support system including a track brake apparatus.

The rack and pinion drive includes a drive mechanism and a controller. The drive mechanism includes a drive bar, a drive motor, a drive pinion, and a encoder coupled to the drive motor.

The drive bar defines a plurality of teeth extending substantially the length of the drive bar. With the drive bar disposed in the area defined by the parallel tracks and extending substantially parallel to the tracks. With the drive motor disposed in the support structure, typically coupled to a support mounting plate. The drive motor is coupled to the drive pinion with the drive pinion configured to rotably engage the teeth of the drive bar along the entire length of the drive bar. Rotation of the drive pinion along the drive bar moves the support structure on the tracks.

The controller is coupled to the drive motor and configured to selectively position the movable support structure along the path in response to a signal received from the encoder. The trash rake apparatus, mounted on the support structure, is positioned proximate the intake rack to remove debris from the intake screen as the support structure moves along the track system as controlled by the controller.

In another embodiment, the rack and pinion drive for a trash rake system includes a proximity sensor system. The proximity sensor system includes a plurality of sensor targets and a plurality of proximity sensors.

The sensor targets are disposed parallel to the track system between the two parallel tracks at preselected locations. Each sensor target is aligned on a different longitudinal line between the tracks. In another embodiment, each of the sensor targets are of different length to represent an area of water associated with a specific water depth. Such data is programmed in the controller and is used by the controller to control the trash rake system.

The proximity sensors are coupled to the controller and to the support structure with each proximity sensor aligned to sense one of the sensor targets. Each proximity sensor is configured to send a location signal to the controller. In one embodiment, the plurality of sensor targets are angle irons composed of a ferrous material. The proximity sensors are configured to sense the sensor targets based on magnetic flux. A typical arrangement of the proximity sensors is in a straight line traverse to the direction of travel of the support structure. Other configurations of the sensors consistent with the present disclosure can be arranged by a user or manufacturer of the trash rake system.

In a further embodiment, the controller is configured to compare the signal from the encoder and the signal from one of the proximity sensors. If the signals are equal, the controller will operate the trash rake to extend to a water depth associated with the preselected location on the path of the track system. If the signals are not equal the controller will operate the trash rake to extend to a default water depth. A typical default water depth is 8 feet, however it should be understood that any default water depth can be programmed into the controller as determined by the user. In some embodiments the default depth will be zero, meaning the controller will not extend the trash rake apparatus.

The location of the sensor targets are associated with a specific water depth at the water facility at which the trash rake system is installed. Each sensor target is of a length representative of a distance along the track system associated with the specific water depth at the specific location along the track system. For example, at the portion of the water facility that is closest to a shoreline, the water depth typically is less than in the middle segment or section of the water facility. Accordingly, a sensor target near the shoreline will be associated with a lesser water depth than one of the other sensor targets. Further, if the water depth near the shoreline is 8 feet for a distance of 10 feet, the sensor target will be 10 feet long and the controller will be programmed for the specific depth along the length of that specific sensor target.

In some water facilities, there may be certain areas that an intake screen or rack is not installed, for example, at a gate, a pylori or a buttress. For such configuration a no-rake sensor is installed on the moveable support structure. A typical arrangement is the no-rake sensor extends from the moveable support structure and is aligned to sense a no-rake target disposed along the track system at the location not to be raked by the trash rake apparatus. The no-rake sensor is configured to send a location signal to the controller, with the controller configured to not operate the trash rake apparatus upon receipt of that location signal. The no-rake target is of a length representative of the no-rake location.

The rack and pinion drive for the trash rake system can include a cam follower which is coupled to the moveable support structure. The cam follower is typically a circular disk configured to engage the drive bar. The cam follower typically is coupled to the mounting plate which supports the drive motor and drive pinion. The cam follower applies a force against the drive bar opposite the drive pinion to facilitate stability of the moveable support structure.

There is also provided a method of clearing debris from a intake screen of the intake rack of a water intake port of a water use facility. The intake screen is configured to collect debris transported by the water before the debris enters the intake port. The method includes a step of installing a track system positioned proximate a portion of the intake rack and aligned with the intake rack.

The track system includes two parallel tracks with the path of the track system including at least one of a straight section and a curved section. The track system is aligned with the water facility deck or overhead support structure. The track system typically include a curved section at one or both ends of the track system to facilitate disposal of the collected debris.

A moveable support structure is mounted on the track system with the support structure configured to move on the track system. The support system includes a track rake apparatus.

A drive mechanism is installed on the moveable support structure with the drive mechanism including a drive bar, a drive motor, a drive pinion, and an encoder coupled to the drive motor. The drive bar defines a plurality of teeth extending substantially the length of the drive bar with the drive bar disposed in an area defined by the parallel tracks and extending substantially parallel to the tracks. In other words, if the track system is in a straight line at one portion of the track system, the drive bar is straight and parallel if the track system curves the drive bar will curve and maintain its parallel orientation between the track rails.

The drive motor is coupled to the drive pinion with the drive pinion configured to rotably engage the teeth of the drive bar along the entire length of the drive bar. The rotation of the drive pinion along the drive bar moves the support structure on the tracks.

A controller is installed and is coupled to the drive motor and is configured to selectively position the moveable support structure along the path in response to a signal received from the encoder. The trash rake apparatus is positioned proximate the intake rack to remove debris from the intake screen. The controller is typically programmed to operate the trash rake system to move from an area at which trash is removed to an area where the trash is disposed.

In another embodiment, the method includes the step of providing a proximity sensor system. The proximity sensor system includes installing a plurality of sensor targets, disposed parallel to the track system, between the two parallel tracks at preselected locations. Each sensor target is aligned on a different longitudinal line between the tracks. The proximity sensor system further includes installing a plurality of proximity sensors coupled to the controller and the support structure. Each proximity sensor is aligned to sense one of the sensor targets. Each of the proximity sensors is configured to send a location signal to the controller.

In the embodiment that includes the proximity sensor system, the controller is configured to compare the signal from the encoder and the signal from one of the proximity sensors. If the signals are equal the controller will operate the trash rake to extend to a water depth associated with the preselected location on the path of the track system. If the signals are not equal, the controller will operate the trash rake to extend to a default water depth. The controller can also be configured to operate the trash rake system automatically.

BRIEF DESCRIPTION OF THE DRAWINGS

FIG. 4 is an illustration of an exemplary embodiment of a rack and pinion drive, including a drive motor and encoder, for a trash rake system, with the drive motor in a vertical aspect;

FIG. 5 is a top view of the rack and pinion drive illustrated in FIG. 4;

DETAILED DESCRIPTION OF THE EXEMPLARY EMBODIMENT

Referring to the FIGS. 1-11, there is disclosed a fully powered trash rake system for clearing debris from water intake screening systems, such as intake racks. A trash rake system is fully electronically powered in all phases of operation and may be operated in a manner such that pollution due to leaks of hydraulic fluid are avoided and full functional operation of the system under all temperature conditions is assured. An exemplary trash rake system will be described in detail herein with reference to the use thereof for clearing debris from an intake screen 16 of an intake trash rack used to collect debris from the water intake of a hydroelectric power plant or similar facility.

It should be understood, however, that a trash rake system may also be employed to clear debris from various water intake screening systems and structures other than intake racks, as well as other similar systems and structures. For example, a trash rake system in accordance with the present invention may be used to clear debris from intake screens, cooling water screens, storm water overflow screening structures, culvert and drainage underflow screening structures, headworks, and flow straighteners, etc.

A trash rake system may be used to clear debris from such intake or other screening structures as used in association with hydroelectric or other power plants, intake ducts for nuclear energy or other facility cooling water, pulp and paper mills, steel mills, petrochemical plants, municipal water and/or waste water treatment plants, fish diversions, and other water filtering or screening facilities or systems, etc. A trash rake system may be used to clear debris from water intake screening structures for such systems and facilities as may be located in any natural or man-made exposed above-ground water source, such as rivers, lakes, oceans, reservoirs, irrigation and flood water canals, water parks, and other water conveyance structures, etc. in which any variety or type of natural or man-made debris may be found that otherwise might clog or obstruct such an intake screening system or structure.

It is known that a trash rake system can be articulated by a chain system, however a chain system is not reliable for moving a trash rake system along a curve track. The chain tends to bind or "jump" off the sprocket wheel. The drive mechanism 88 disclosed herein avoids such occurrences to reliably move the trash rake system along a curved track.

Figure 1:
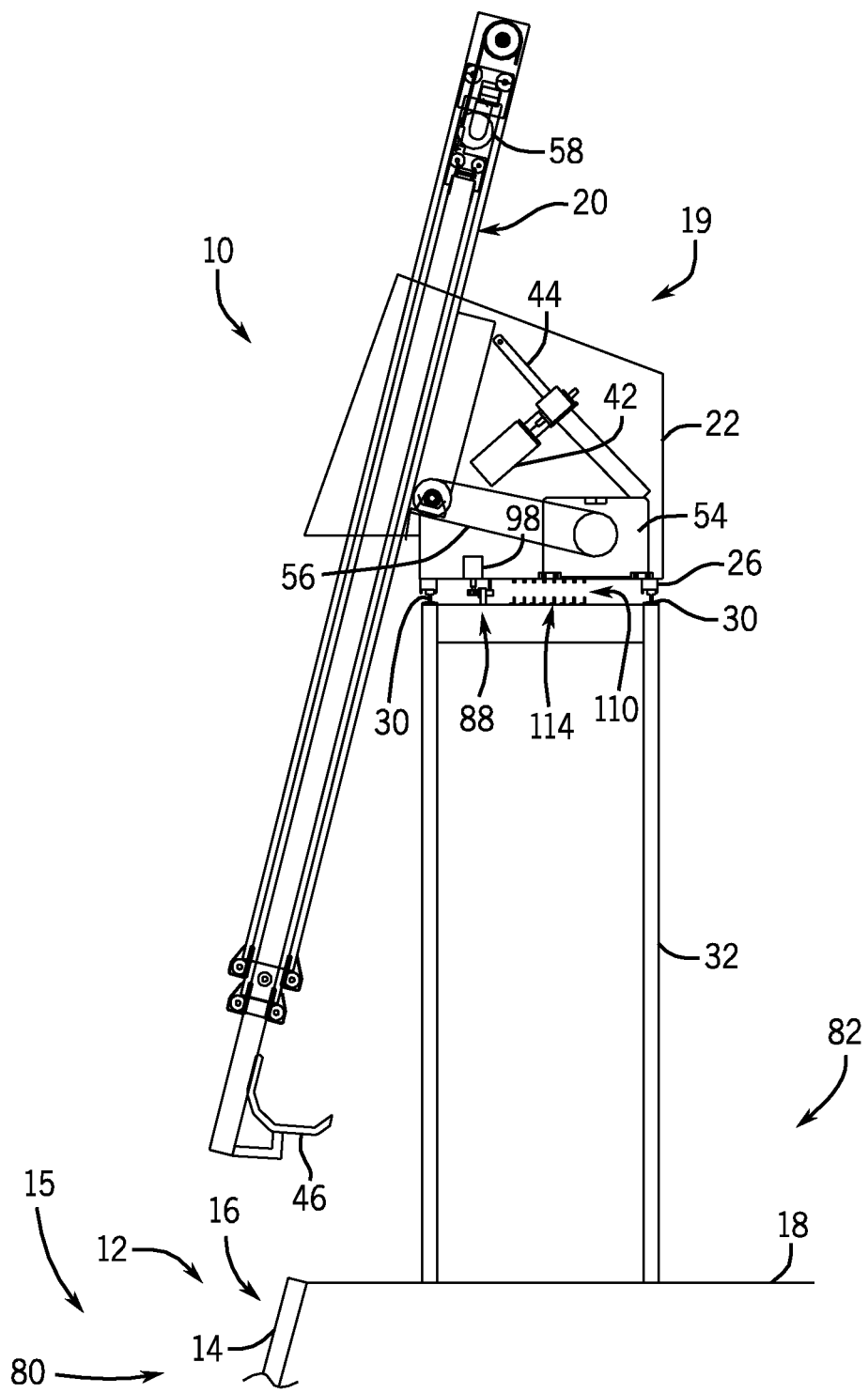
FIG. 1 is a schematic side view illustration of an exemplary trash rake system in accordance with the present invention as mounted on overhead rails above an intake rack from which debris is to be removed thereby.
Figure 2:
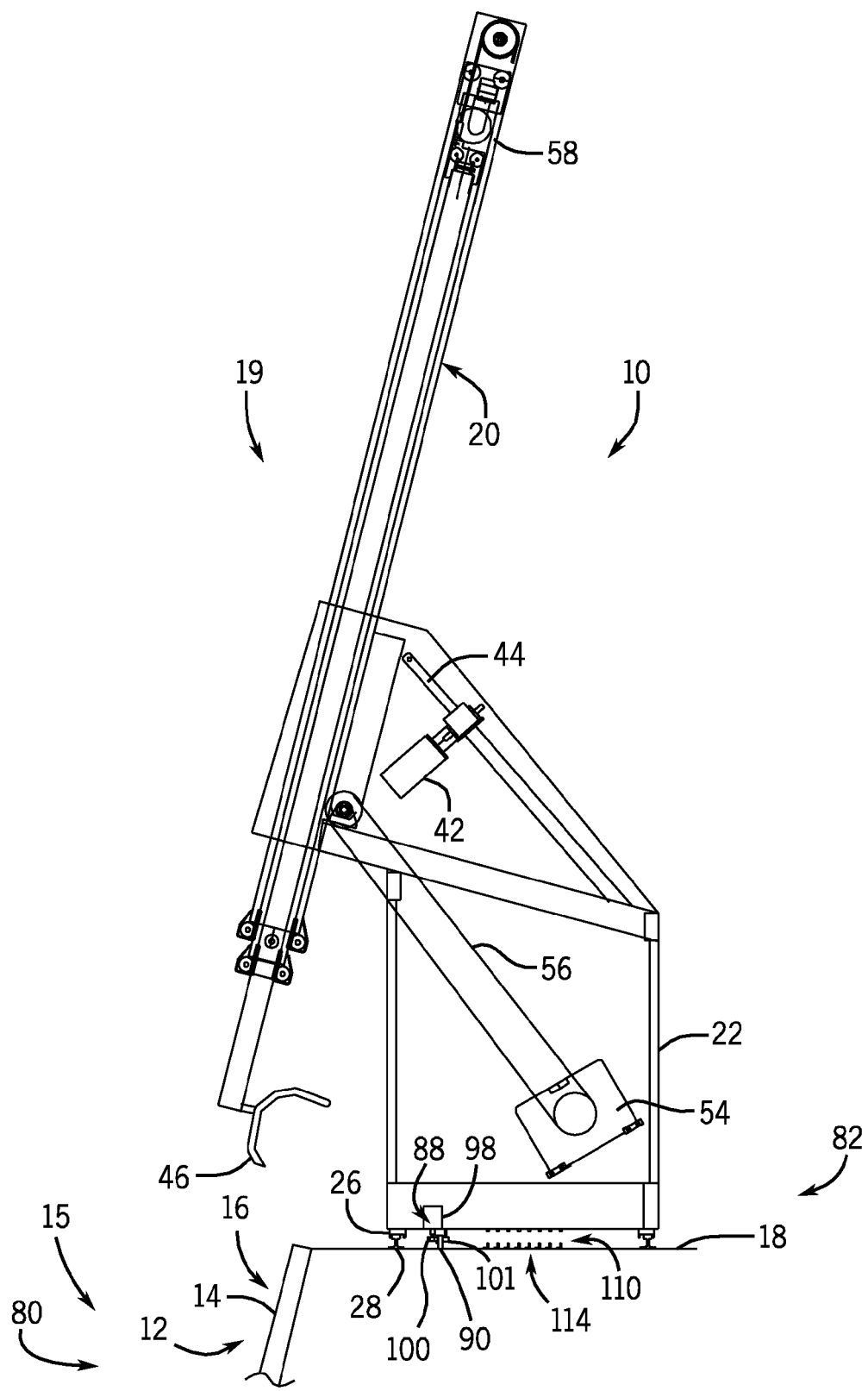
FIG. 2 is a schematic side view illustration of the trash rake system in accordance with the present invention showing a trash rake structure mounted on an intake deck of an intake trash rack.

An exemplary trash rake system 10 in accordance with the present invention is illustrated in various views thereof in FIGS. 1 and 2. The exemplary trash rake system 10 is illustrated in association with an intake trash rack 12. The particular exemplary trash rake system 10 illustrated herein is designed specifically to clear debris from such an intake trash rack 12. However, as discussed above, a trash rake system also or alternatively may be designed to clear debris from other types of intake racks or other water intake screening systems.

A typical intake trash rack 12 is formed of a series of spaced apart blades 14. The intake trash rack 12 is positioned such that the parallel blades 14 extend downward substantially vertically into a water source 15, e.g., a river. A water intake port 80, e.g., for a hydroelectric plant or other system or facility, is positioned approximately directly behind, e.g., downstream from, the intake rack 12. Thus, water flowing downstream is allowed to enter the water intake through the spaces formed between the vertical blades 14 and intake screen 16 forming the intake rack 12. (Note that additional finer screening of debris also may be provided between the intake rack 12 and the system or facility water intake.) Natural or man-made debris flowing downstream, however, is prevented from entering the water intake by the blades 14 of the intake rack 12. Such debris captured by the intake rack 12 will tend to accumulate on the surface of the rack 12, typically at or slightly below the water line.

A horizontal intake deck 18 typically is provided along the top of the intake trash rack 12. The intake deck 18 thus is located above the water intake and allows a facility operator or other individual to access and inspect the intake rack 12 from above.

A trash rake system 10 includes a trash rake apparatus 19 including a telescoping boom structure 20 movably mounted on a support structure 22. The support structure 22 preferably may be a substantially box shaped structure that is designed both to support the telescoping boom 20 as well as to contain therein various electric motors and other components used to power and otherwise operate the trash rake system 10, as will be described in more detail below. As illustrated in FIGS. 1 and 2, the box like support structure 22 preferably is at least partially enclosed or covered, e.g., with a sheet metal or other covering attached to a support structure frame made of steel or some other appropriate structural material, thereby to protect the electronic and/or mechanical components contained therein from the elements.

The trash rake system support structure 22 may be positioned and mounted on the intake deck 18 such that the telescoping boom 20 extends outward from the intake deck 18 over the intake trash rack 12 to be cleaned. As illustrated in FIG. 2, the trash rake support structure 22 may be positioned and mounted directly on the intake deck 18. Alternatively, as illustrated in FIG. 1, the trash rake support structure 22 may be elevated above the intake deck 18. This configuration may be preferred in that it allows an operator to walk along the intake deck 18 underneath the trash rake system 10 during operation of the trash rake system 10 to clear debris from the trash intake rack 12 below.

The trash rake system support structure 22 preferably may be implemented as a movable carriage. Such a movable carriage support structure 22 is mounted on the intake deck 18, or in a position elevated over the intake deck 18, such that the carriage 22 may be moved along the intake trash rack 12 thereby to position the telescoping boom 20 at any position along the trash rack 12. For example, the carriage support structure 22 may be mounted via rotatable wheels 26 to a track structure 28 mounted running along the intake deck 18. Alternatively, as illustrated in FIG. 1, the tracks on which the carriage support structure 22 is mounted may be elevated overhead rails. For example, the elevated overhead rails 30 may be supported in position over the intake deck 18 by an appropriate sturdy overhead rail support structure 32.

A drive mechanism 88 including a drive motor 98 coupled to a drive pinion 100 and an encoder coupled to the drive motor is provided in or on the carriage support structure 22 to drive the carriage support structure 22 and, therefore, the entire trash rake system 10, back and forth along the trash intake rack 12 to be cleaned, to position the trash rake system 10 in a desired position with respect thereto. The type and size of electric drive motor 98 to be employed will depend upon the size and weight of the particular trash rake system 10 in accordance with the present invention to be moved thereby.

The drive mechanism 88 further includes a mounting plate 96 attached to the support structure 22 with the mounting plate 96 supporting and aligning the drive motor 98 and drive pinion 100. The drive pinion rotably engages a plurality of teeth 95 defined on a drive bar 90.

The drive pinion 100 can be coupled to the drive motor 98 with a gear train configured to provide different speeds, i.e. fast or slow, of movement for the support structure 22. Speed control can also be accomplished by varying the electrical energy delivered to the drive motor 98 as controlled by the controller 62, 74.

The drive bar 90 extends substantially the entire length of the track system 104. The drive bar 90 is disposed in an area defined by the parallel tracks 106 and extends substantially parallel to the tracks. In other words, the drive bar 90 is maintained the same distance from one of the tracks 106 from one end of the path 108 to another end. The drive bar 90 follows the path 108 defined by the two tracks 106 of the track system 104. A straight section 94 of the drive bar 90 corresponds to a straight section of the tracks 106 of the track system 104 and a curved section 92 of the drive bar 90 corresponds to a curved section of the track 106 of the track system 104. The curved section 92 can be an inside curve (meaning curved toward the drive motor 98), or an outside curve (meaning curved away from the drive motor 98). See FIGS. 6 and 8.

Figure 6:
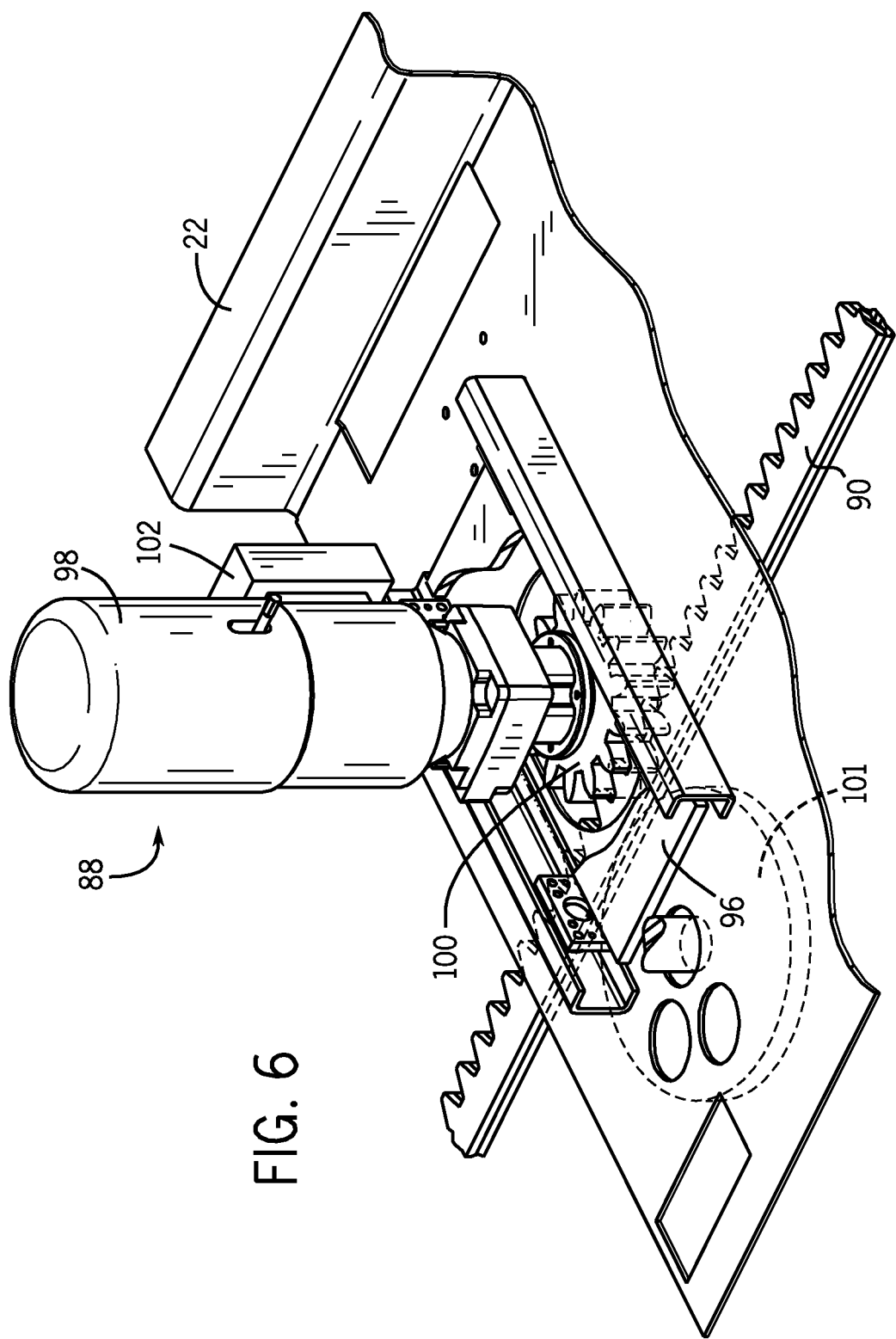
FIG. 6 is a perspective view of the rack and pinion drive illustrated in FIG. 4 mounted inside the support structure illustrated in FIGS. 1 and 2, with the rack and pinion drive including a cam follower applying a force against the drive bar opposite the drive pinion.
Figure 7:
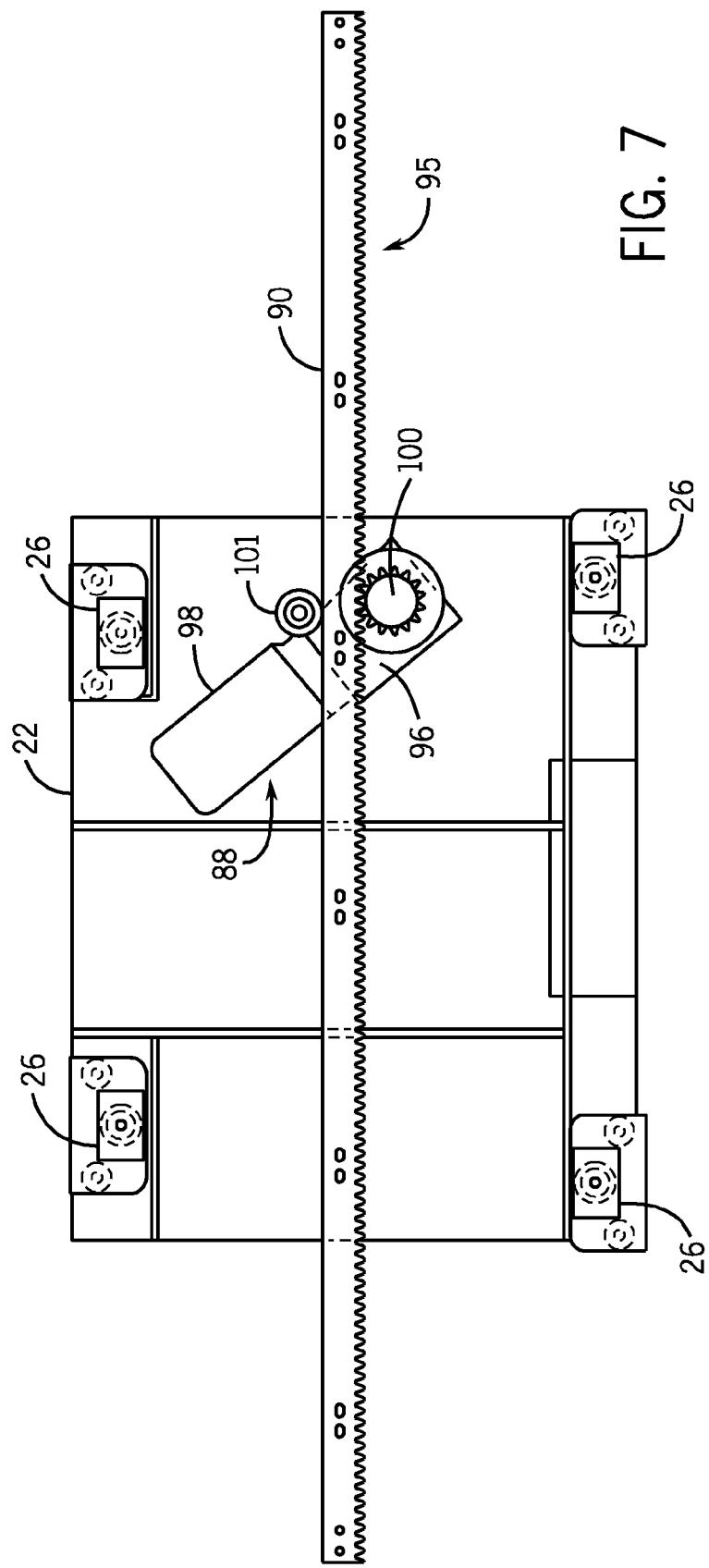
FIG. 7 is an illustration of the rack and pinion drive mounted in the support structure with the drive motor in a horizontal aspect.
Figure 8:
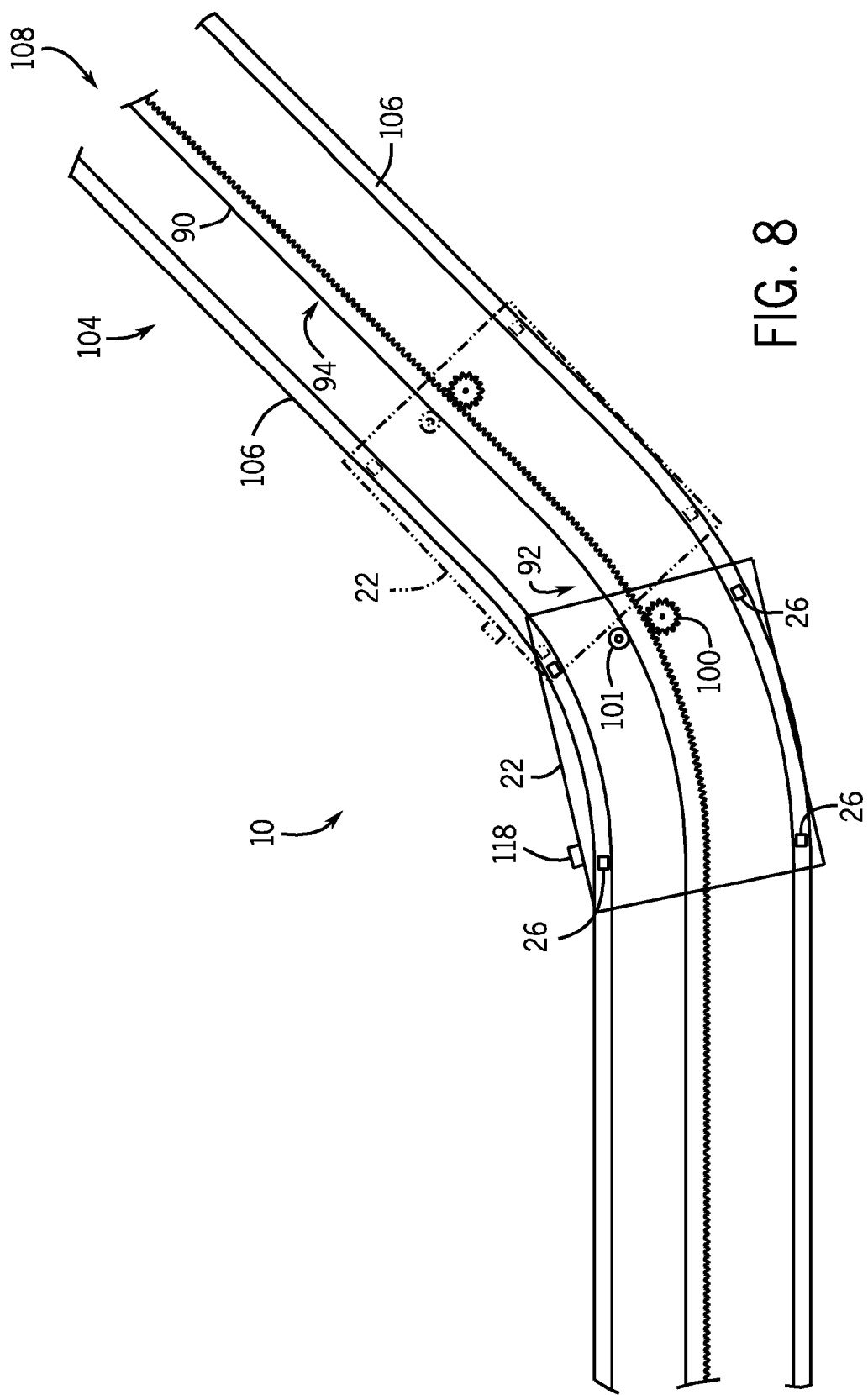
FIG. 8 is a top view of a track system on an intake deck of a water facility illustrating movement of the support structure of the trash rake system disclosed herein along the drive bar.
Figure 9:
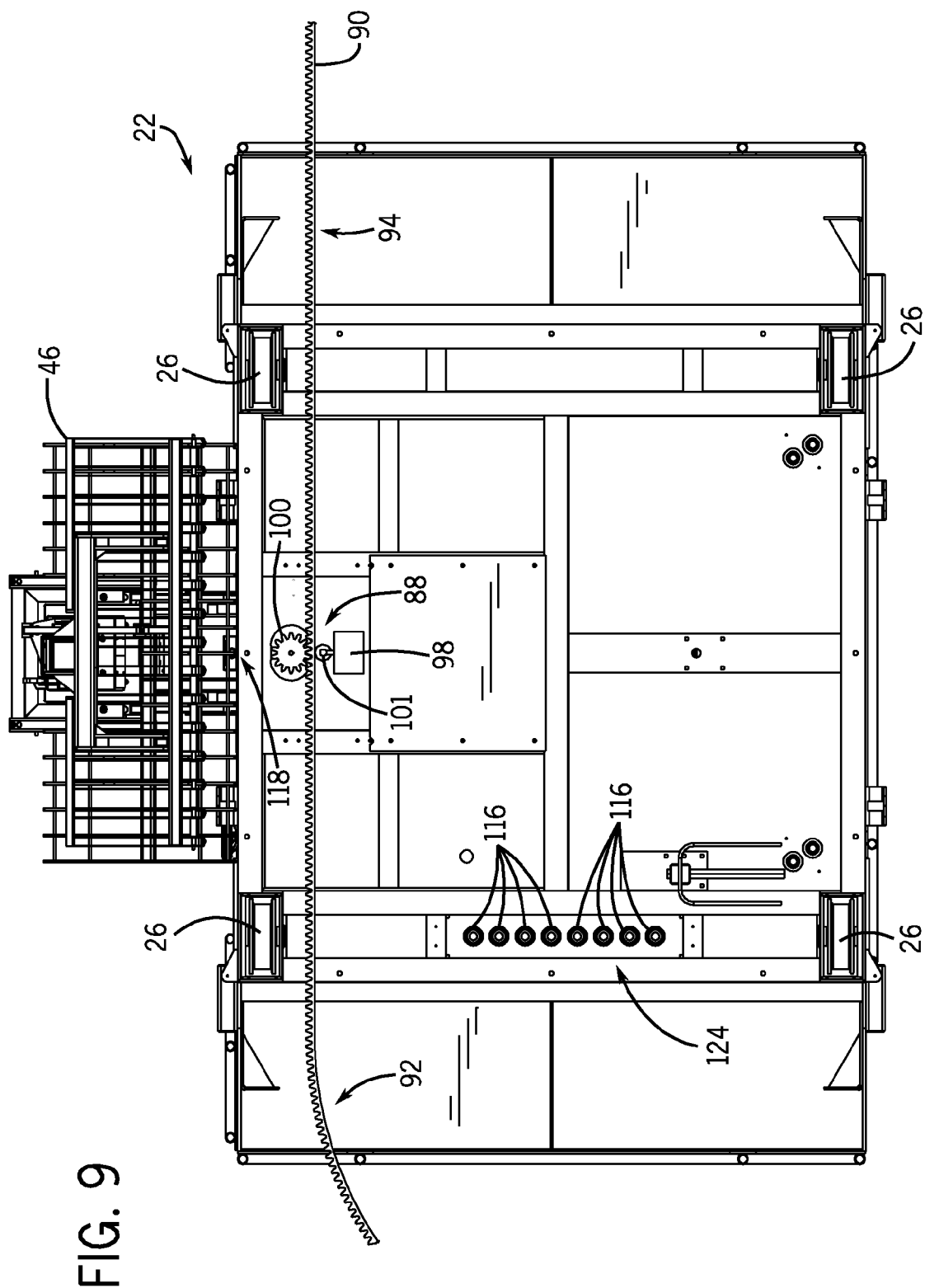
FIG. 9 is a bottom view of the support structure of the trash rake system illustrating an exemplary embodiment of an array of proximity sensors of a proximity sensor system and an exemplary embodiment position of a no-rake sensor.
Figure 10:
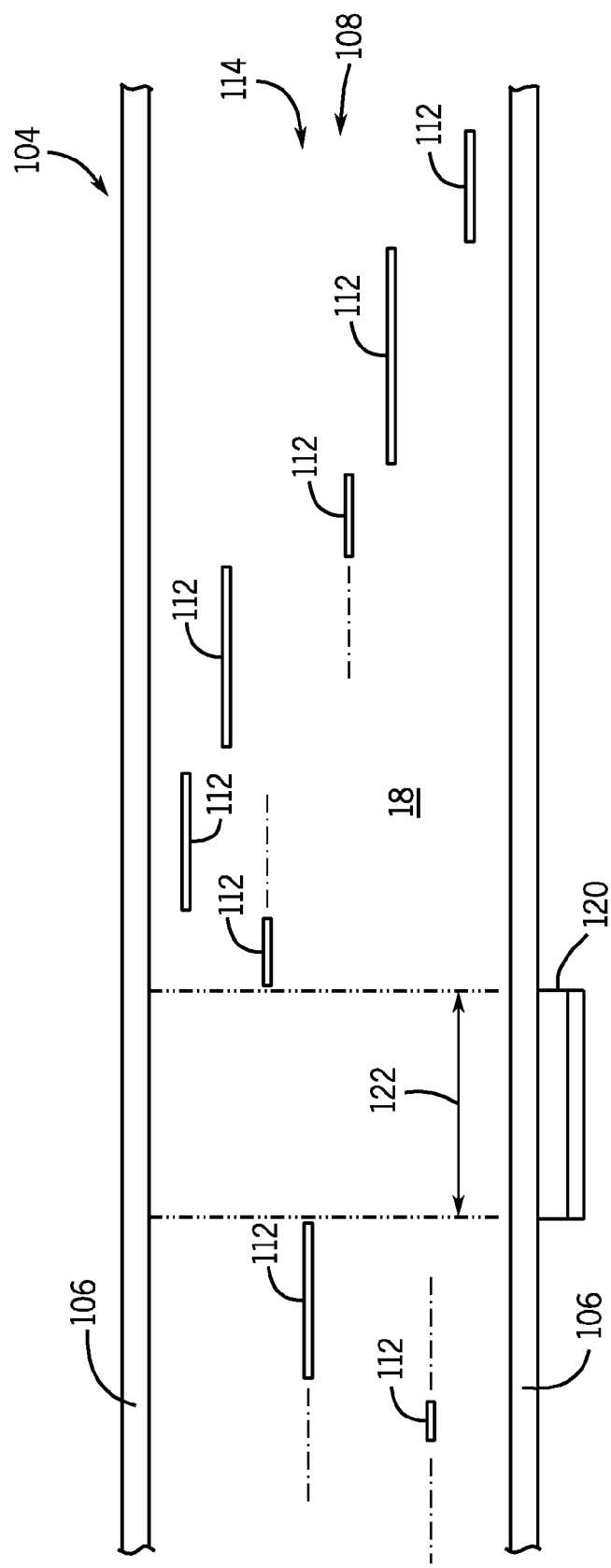
FIG. 10 is a schematic top view illustration of a plurality of sensor targets positioned on the intake deck illustrated in FIG. 2, with each sensor target on a separate longitudinal line, and positioned and configured to represent a specific location and water depth.
Figure 11:
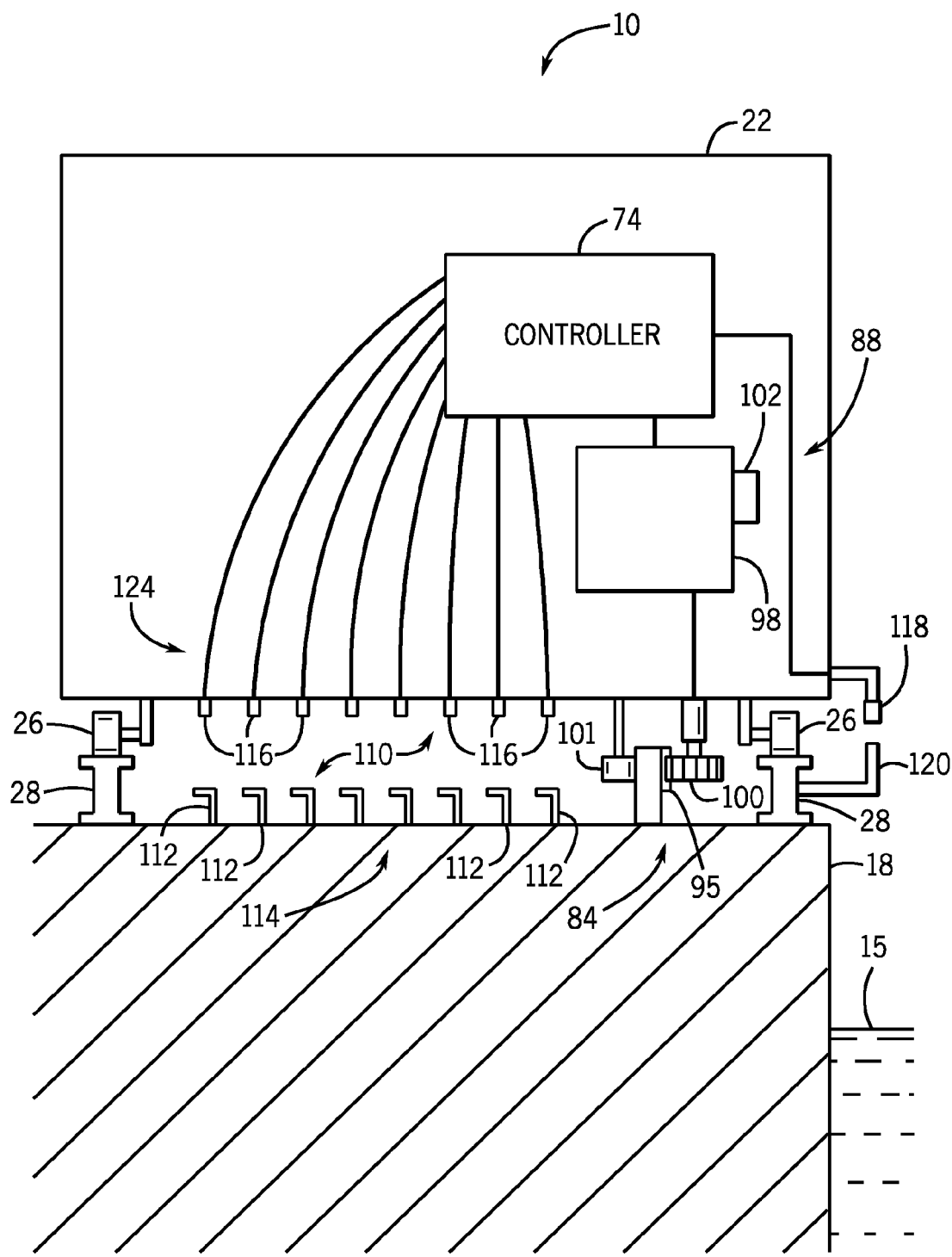
FIG. 11 is a partial cross-section view of the trash rake system illustrated in FIG. 2.

The drive bar 90 can be oriented with the teeth 95 aligned ninety degrees from the vertical as illustrated in FIGS. 4, 6, and 7, with the drive motor 98 aligned vertically. The drive bar 90 can also be oriented with the teeth 95 aligned vertically with the drive motor 98 aligned horizontally.

The telescoping boom portion 20 of a trash rake system 10 in accordance with the present invention includes multiple elongated telescoping sections. For example, a three section telescoping boom 20 is illustrated in the figures presented herein. It should be understood, however, that a telescoping boom 20 employed in a trash rake system 10 may have more or fewer than three telescoping sections.

A first or proximal section of the telescoping boom 20 is mounted on the trash rake system support structure 22. The telescoping boom 20 is mounted in a movable hinged or rotatable relation to the support structure 22 in a conventional manner. Thus, the telescoping boom 20 may be tilted with respect to the support structure 22 to move a distal end of the telescoping boom 20, which extends downward over the trash intake rack 12 to be cleaned, either inward toward the trash intake rack 12 or outward away from the trash intake rack 12. (FIG. 1 illustrates the telescoping boom 20 tilted in a position outward away from the intake trash rack 12 to be cleaned, as well as the position of the distal end of the exemplary telescoping boom 20 in a position where the telescoping boom 20 is tilted inward toward the trash intake rack 12 to be cleaned.)

An electric tilt drive motor 42 preferably is provided to tilt the telescoping boom 20 under power to position the distal end thereof in a desired position with respect to the trash intake rack 12 to be cleaned. For example, the tilt drive motor 42 may be used to drive a rod 44 or other similar structure that is movably coupled to the telescoping boom 20 inward and outward, thereby to tilt the telescoping boom 20 into a desired position. Other conventional methods for coupling the tilt drive motor 42 to the telescoping boom 20 to provide powered adjustment of the tilt position of the telescoping boom 20 also or alternatively may be employed. The specific size and type of tilt drive motor 42 to be employed will depend upon the size and weight of the telescoping boom portion 20 of the trash rake system 10 to be moved thereby.

A trash rake structure 46 is mounted at the distal end of the telescoping boom 20. An exemplary trash rake structure 46 that may be employed in accordance with the present invention is illustrated in FIGS. 1 and 2. It should be understood, however, that other types, sizes, and configurations of trash rake structures may be employed in a trash rake system 10 in accordance with the present invention. For example, the trash rake structure employed in a trash rake system in accordance with the present invention may include brushes, scrapers, and other similar or different structures in addition to or in place of the rake tines of the trash rake structure 46. An exemplary trash rake structure 46 to be employed may include a plurality of rake tines made of steel or another appropriate material. A plurality of parallel curved rake tines may be provided to form a basket like shape for the trash rake structure 46. The spacing between the rake tines preferably corresponds to the spacing between the blades 14 forming the trash intake rack 12 to be cleaned thereby. For example, the trash rake tines preferably are spaced apart sufficiently such that adjacent tines extend into adjacent spaces between the blades 14 of the trash intake rack 12 when the trash rake structure 46 is placed against the surface of the trash intake rack 12 to engage the rack 12. Spacer rollers may be provided between the rake tines, near but spaced backward from the ends thereof that are to engage the trash intake rack 12 to be cleaned. The spacer rollers both limit the extent to which the ends of the rake tines extend into the spaces between the intake trash rack blades 14, and facilitate the sliding of the trash rake structure 46 along the trash intake rack blades 14 during a cleaning operation as will be described in more detail below, during which the spacer rollers are positioned against and roll along the intake rack blades 14.

The trash rake structure 46 preferably is mounted in a hinged or movable relation to the distal end of the telescoping boom 20 such that the trash rake structure 46 may be moved between at least two different orientations with respect to the distal end of the boom 20, a raking position or orientation and a dumping position or orientation. In a raking position or orientation for the trash rake structure 46, as illustrated, e.g., in FIG. 1, the concave side of the rake structure 46 formed by the curved tines faces upward. As will be discussed in more detail below, this raking position or orientation for the trash rake structure 46 is used as the trash rake structure 46 is drawn vertically upward along the trash intake rack 12 to clear debris therefrom. In the dumping position or orientation for the trash rake structure 46, as illustrated, for example, in FIG. 2, the concave side of the trash rake structure 46 formed by the curved tines thereof faces downward. This position or orientation for the trash rake structure 46 is employed to dump debris gathered onto the trash rake structure 46 during the raking or cleaning operation at a desired trash dumping or disposal location located proximate the trash intake rack 12 being cleaned.

A controller 74 may be provided to operate remotely the position or orientation of the trash rake structure 46 from the raking position or orientation to the dumping position or orientation and back again. For example, one or more cables or chains may be run down the telescoping boom 20 and coupled to the movable trash rake structure 46 in an appropriate manner such that actuation of the cables or chains, either manually or using an electric motor, changes the orientation of the trash rake structure 46 between the raking and dumping positions and back again. Similarly, a rotatable auger or screw mechanism may be coupled to the rake structure 46 in an appropriate manner and driven by an electric or other motor to change the orientation of the trash rake structure 46 between the raking and dumping positions and back again. Alternatively, a single cable or chain may be attached to the trash rake structure 46 which, when actuated, moves the trash rake structure 46 from the raking position or orientation to the dumping position or orientation. A plate or other similar structure may be mounted or otherwise attached to the trash rake structure 46 on the back or convex side of the rake tines. As the trash rake structure 46 is lowered into a flowing water source 15, with the trash rake structure 46 in the dumping position or orientation, the flow of water against the plate pushes the trash rake structure 46 back into the raking position or orientation. This may be used either alone or in combination with another structure or method as an assist to moving the trash rake structure 46 from the dumping position or orientation back into the raking position or orientation. For example, an appropriate spring mechanism may be used, either alone or in addition to the plate described above, to move the trash rake structure 46 from the dumping position or orientation back to the raking position or orientation. Appropriate releasable latching or similar mechanisms may be employed to ensure that, once the trash rake structure 46 is in the desired raking or dumping position or orientation, the position or orientation of the trash rake structure 46 does not change unintentionally until the position or orientation of the trash rake structure 46 is intentionally changed by an operator of the trash rake system 10 in accordance with the present invention.

In an alternative method, changing the orientation of the trash rake structure 46 from the raking position to the dumping position may be accomplished under power as part of the powered retraction of the telescoping boom 20. For example, the trash rake structure 46 may be mounted to the distal end of the telescoping boom 20 such that when the telescoping boom 20 is fully retracted a trip mechanism is activated to move the trash rake structure 46 from the raking position to the dumping position. As will be described in more detail below, retraction of the telescoping boom 20 may be controlled such that retraction of the boom under power is stopped automatically just before full retraction resulting in moving the trash rake structure 46 to the dumping position. A separate input preferably is required to retract fully the telescoping boom 20 to perform the dumping operation. This prevents an operator from accidentally fully retracting the telescoping boom 20 and thereby dumping the contents of the trash rake structure 46 unintentionally. When the telescoping boom 20 is extended from the fully retracted position the trip mechanism for moving the trash rake structure 46 to the dumping position is disengaged and the trash rake structure may be moved back into the raking position or orientation. This may be accomplished using a spring loaded mechanism to move the trash rake structure 46 back into the raking position and/or by employing the flow of water against the plate mounted on the trash rake structure 46 as described above.

The trash rake structure 46 mounted at the distal end of the telescoping boom 20 is moved vertically along the trash intake rack 12 to be cleaned by extension and retraction of the telescoping boom 20. Retraction and extension of the telescoping boom 20 to move the trash rake structure 46 attached thereto up and down along the trash intake rack 12 to be cleaned preferably is accomplished automatically under power using an electric motor driven winch 54, e.g., mounted in the trash rake system support structure 22, and coupled via a cable or chain 56 to a pulley and cable or chain system 58 mounted, e.g., at least partially within a hollow interior of the telescoping boom 20. The pulley and cable or chain structure 58 preferably is implemented in a conventional manner such that operation of the electric motor driven winch 54 in one direction extends the distal end of the telescoping boom 20 under power, while operation of the electric motor driven winch 54 in the other direction retracts the distal end of the telescoping boom 20. Thus, it is preferred that the movement of the distal end of the telescoping boom 20 be automated and powered in both the extension and retraction thereof. Other electric motor driven mechanisms also or alternatively may be employed to retract and extend the telescoping boom 20 under power in both directions. The type and size of the electric motor used to drive the winch 54 or other mechanism for extending and retracting the telescoping boom 20 will depend upon the desired lift capacity of the boom, size, weight of the boom to be extended and retracted thereby.

Figure 3:
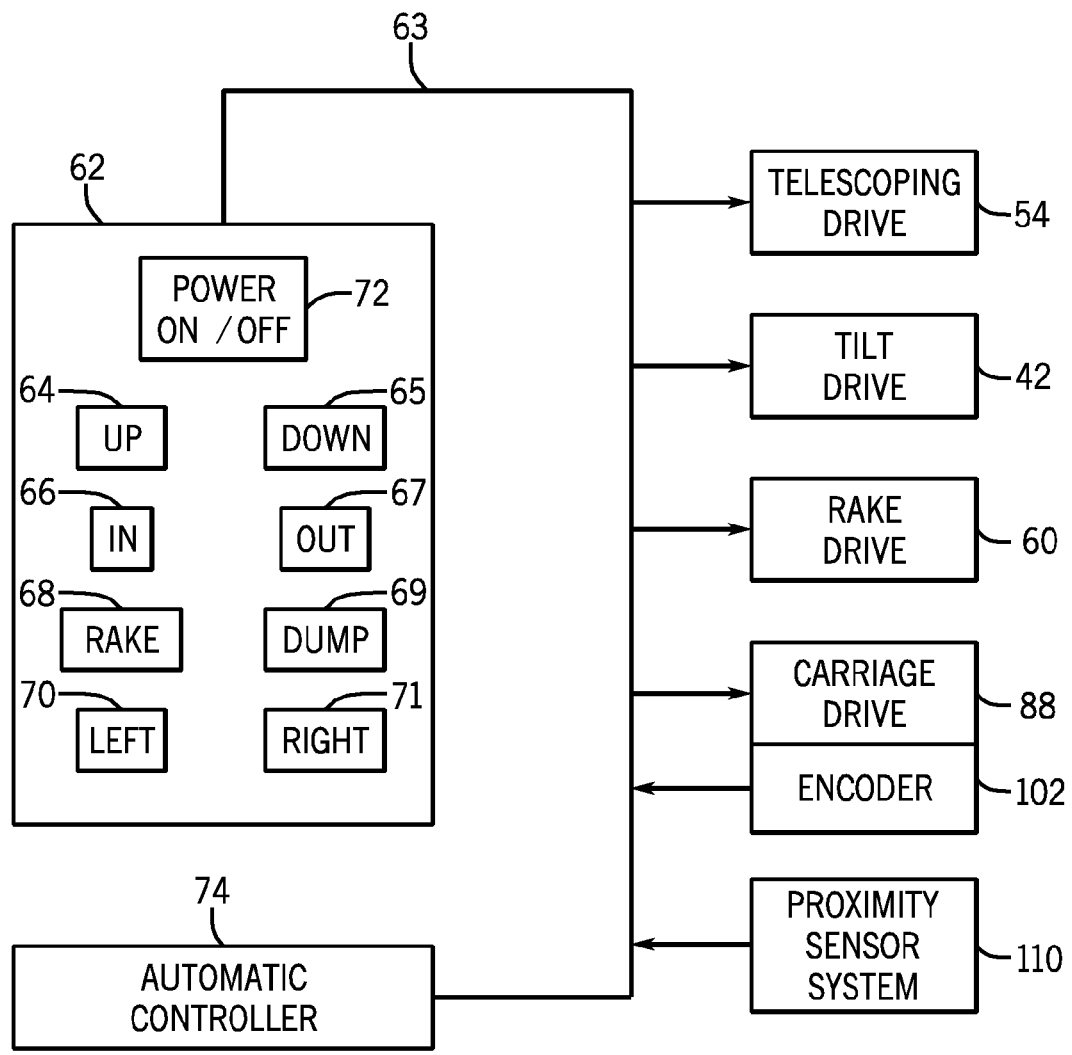
FIG. 3 is an exemplary embodiment of a schematic block diagram illustrating the various electric drive motors used to operate an exemplary trash rake system in accordance with the present invention along with a schematic illustration of an exemplary hand-held operator controller and a controller for controlling operation of a trash rake system in accordance with the present invention.

As illustrated in FIG. 3, a hand held control unit 62 preferably may be provided to enable an operator of a trash rake system 10 to control and use the trash rake system 10 to clean a trash intake rack 12 with which it is associated. The hand held control unit 62 may be implemented in a conventional manner to provide appropriate control signals under operator command, via a conventional wired or wireless connection 63, to control operation of the telescoping drive 54 for extending and retracting the telescoping boom 20, the tilt drive 42 for tilting the telescoping boom 20, a trash rake position drive 60 (if any) for changing the position of the trash rake structure 46 between the raking and dumping positions and back again, and the trash rake drive mechanism 88 for moving the trash rake system 10 horizontally along the intake rack 12, as described above. It should be understood that appropriate electronic drive circuits (not shown) are provided between the hand held controller 62 and the various electric or other motors used to operate the trash rake system 10 in order to convert the control signals provided by the hand held controller 62 into appropriate drive signals for controlling operation of the various electric or other motor drives.

The hand held controller 62 may be provided with various conventional buttons, switches, or other input mechanisms that may be actuated by an operator to generated the control signals required to position the trash rake system 10 in a desired position and to operate the trash rake system 10 during a cleaning operation. Various different types of physical or virtual buttons may be employed for this purpose. Alternatively, other conventional operator interface structures, such as a joy stick, may be employed to generate the control signals required to control operation of the various drives used to position and operate the trash rake system 10.

In the exemplary handheld controller 62 illustrated in FIG. 3, "Up" 64 and "Down" 65 buttons are provided which, when actuated by an operator, generate and send appropriate control signals to operate the drive unit 54 for the telescoping boom 20, thereby, respectively, to retract the telescoping boom 20 to move the trash rake structure 46 attached to the distal end of the telescoping boom 20 upward, and to extend the telescoping boom 20 to move the trash rake structure 46 under power in a downward direction.

"In" 66 and "Out" 67 buttons may be provided on the hand held control unit 62 which, when actuated by an operator, generate and send control signals to the tilt drive unit 42 to operate the tilt drive unit 42 to tilt the telescoping boom 20 such that the trash rake structure 46 at the distal end thereof is moved, respectively, either inward toward the surface of the trash intake rack 12 being cleaned or outward away from the trash intake rack 12 being cleaned.

"Rake" 68 and "Dump" 69 buttons may be provided on the hand held controller 62 which, when actuated by an operator, generate and send control signals to a rake drive 60, if any, thereby, respectively, to move the trash rake structure 46 mounted at the distal end of the telescoping boom 20 into a raking position, as illustrated in FIG. 1, or a dumping position, as illustrated in FIG. 2. (Alternatively, the "Dump" button 69 may be used to generate a control signal to the telescoping drive 54 to fully retract the telescoping boom 20 thereby to engage a trip mechanism to move the trash rake structure 46 from the raking to the dumping position, as described above. In such a case, actuation of the "Up button 64 may be prevented from fully retracting the telescoping boom, to prevent unintended dumping of the trash rake structure 46.) "Left" 70 and "Right" 71 buttons may be provided on the hand held control unit 62 which, when actuated by an operator, generate and send control signals to the carriage drive, to operate the carriage drive to move the trash rake system 10 left and right, respectively, along the trash intake rack 12 to be cleaned thereby.

A "Power On/Off" 72 button also may be provided on the hand held control unit 62. The "Power On/Off" button 72 may be actuated by an operator of the hand held control unit 62 to activate the trash rake system 10 for operation. Alternatively, and preferably, a power button, switch, or other device preferably may be provided in a secure location such that the trash rake system 10 may be operated only by authorized personnel. Furthermore, such a power switch or button may be secured by a failsafe system such that operation of the trash rake system 10 is prevented when the trash rake support structure 22 is accessed to perform maintenance or repair services on the electrical and mechanical equipment of the trash rake system 10. For example, access to the interior of the support structure 22 to service the machinery therein may require a key which, in turn, may be obtained only from a compartment which, when opened to obtain the key, locks out operation of the trash rake system 10.

Exemplary operation of the exemplary trash rake system 10 described herein using the exemplary hand held controller 62 to clear debris from an associated trash intake rack 12 now will be described. This discussion will begin assuming that the trash rake system 10 is in an initial position and condition, e.g., with the telescoping boom 20 retracted, with the distal end thereof tilted inward, and with the trash rake structure 46 at the distal end thereof positioned in the dumping position. First the "Left" 70 and/or "Right" 71 buttons of the hand held unit 62 may be operated to send control signals to the drive mechanism 88 thereby to move the carriage support structure 22 horizontally along the trash intake rack 12 to a desired position thereon to be cleaned. When the trash rake system 10 is in the desired position along the trash intake rack 12, the "Out" button 67 may be actuated to send control signals to the tilt drive 42 to tilt the distal end of the telescoping boom 20 outward. The "Down" button 65 may then be actuated to extend the telescoping boom 20 under power to drive the distal end thereof with the trash rake structure 46 thereon downward below the water surface at which debris is likely to collect against the trash intake rack 12. The "Rake" button 68 may be actuated to rotate the trash rake structure 46 at the distal end of the telescoping boom 20 into the raking position. (Alternatively, the trash rake structure may automatically be moved to into the raking position by operation of a spring mechanism and or water flow against the plate attached to the trash rake structure 46, as described above.)

The "In" button 66 on the hand held operating unit 62 may then be actuated to send a control signal to the tilt drive 42 to tilt the distal end of the telescoping boom 20 inward such that the trash rake structure 46 mounted thereon engages the trash intake rack 12 to be cleaned. (i.e., the tines of the trash rake structure 46 extend into the spaces between the intake trash rack blades 14.) The "Up" button 64 on the hand held operating unit 62 is then actuated to send control signals to the telescoping boom winch drive 54 to operate the winch 54 to retract the telescoping boom 20. During retraction of the telescoping boom 20 the trash rake structure 46 at the distal end of the telescoping boom 20 is drawn upward along the intake rack 12 thereby to collect any debris collected against the intake rack blades 14 in the trash rake structure 46. When the telescoping boom 20 is substantially fully retracted the "Out" button 67 is actuated to send a control signal to the tilt drive 42 to tilt the distal end of the telescoping boom 20 outward to disengage the trash rake structure 46 from the intake rack 12 being cleared. The "Left" 70 and/or "Right" 71 buttons on the hand held control unit 62 may be actuated to move the trash rake system 10, with collected debris held in the trash rake structure 46, to a dumping location adjacent to the trash rack 12. With the trash rake system 10 in the desired dumping location, the "Dump" button 69 on the hand held control unit 62 may be actuated to move the trash rake structure 46 into the dumping position (either by activating a rake drive 60 or controlling the telescoping drive 54 to retract fully the telescoping boom 20), thereby to dump the debris collected therein into the desired dumping location. The process just described may then be repeated by moving the trash rake system 10 to different locations along the intake rack 12 to remove collected debris therefrom.

An intake rack cleaning process using a trash rake system 10 as just described may be fully or partially automated, e.g., using an automatic controller 74 instead of or in addition to the hand held control unit 62. For example, the automatic controller 74 may be implemented as a microprocessor or other digital programmable based system that generates the control signals provided to the various drive units of the trash rake system 10 to perform automatically the steps described above to clear debris from an intake rack 12. Such automatic programmable operation may be useful in particular where the trash intake rack 12 and associated trash rake system 10 in accordance with the present invention are located in a remote location or where weather or other conditions would otherwise prevent an operator from operating the hand held control unit 62 to operate the trash rake system 10.

In another embodiment, the rack and pinion drive 84 for trash rake system 10 includes a proximity sensor system 110. The proximity sensor system 110 includes a plurality of sensor targets 114 and an array of proximity sensors 124.

The sensor targets 112 are disposed parallel to the track system 104 between the two parallel tracks 106 at preselected locations. Each sensor target 112 is aligned on a different longitudinal line between the tracks. In another embodiment, each of the sensor targets 112 are of different length to represent an area of water associated with a specific water depth. Such data is programmed in the controller and is used by the controller 74 to control the track rake system 10. The controller is configured to provide end limits to the trash rake system functions, for example the limits of "UP" and "DOWN" of the boom. The end limits are also associated with each sensor target and with limit switches. Such end limits prevent over extension of the equipment for specific functions at specific locations along the track system 104.

The proximity sensors 116 are coupled to the controller 74 and to the support structure 22 with each proximity sensor 116 aligned to sense one of the sensor targets 112. Each proximity sensor 116 is configured to send a location signal to the controller 74. In one embodiment, the plurality of sensor targets 114 are angle irons composed of a ferrous material. The proximity sensors 116 are configured to sense the sensor targets 112 based on magnetic flux. A typical arrangement of the proximity sensors 116 is in a straight line traverse to the direction of travel of the support structure 22. Other configurations of the sensors consistent with the present disclosure can be arranged by a user or manufacturer of the trash rake system 10.

In an embodiment, the controller 74 is configured to compare the signal from the encoder 102 and the signal from one of the proximity sensors 116. If the signals are equal, the controller 74 will operate the trash rake 19 to extend to a water depth associated with the preselected location on the path 108 of the track system 104. If the signals are not equal the controller 74 will operate the trash rake to extend to a default water depth. A typical default water depth is 8 feet, however it should be understood that any default water depth can be programmed into the controller 74 as determined by the user.

The location of the sensor targets 112 are associated with a specific water depth at the water facility 82 at which the track rake system 10 is installed. Each sensor target 112 has a length representative of a distance along the track system 104 associated with the specific water depth at the specific location along the track system 104. For example, at the portion of the water facility 82 that is closest to a shoreline, the water depth typically is less than in the middle segment or section of the water facility 82. Accordingly, a sensor target 112 near the shoreline will be associated with a lesser water depth than one of the other sensor targets. Further, if the water depth near the shoreline is 8 feet for a distance of 10 feet, the sensor target 112 will be 10 feet long and the controller 74 will be programmed for the specific depth for that specific sensor target.

In some water facilities, there may be certain areas that an intake screen 16 or rack 12 is not installed, for example, at a pylori or buttress. At such location a no-rake sensor 118 is installed on the moveable support structure 22. A typical arrangement is the no-rake sensor 118 extends from the moveable support structure 22 and is aligned to sense a no-rake target 120 disposed along the track system 104 at the location not to be raked 122 by the trash rake apparatus 19. The no-rake sensor 118 is configured to send a location signal to the controller 74, with the controller 74 configured to not operate the trash rake apparatus 19 upon receipt of the location signal. The no-rake target 120 is of a length representative of the no-rake location 122.

The rack and pinion drive 84 for the trash rake system 10 can include a cam follower 101 which is coupled to the moveable support structure 22. The cam follower 101 is typically a circular disk configured to engage the drive bar 90. The cam follower 101 typically is coupled to the mounting plate 96 which supports the drive motor 98 and drive pinion 100. The mounting plate 96 is disposed in a linear bearing assembly to allow the mounting plate 96 to move perpendicularly to the direction of travel of the support structure. The cam follower 101 applies a force against the drive bar 90 opposite the drive pinion 100 to facilitate stability of the moveable support structure 22, and to assure the engagement of the drive pinion 100 with the drive bar 90.

There is also provided a method of clearing debris from a intake screen 16 of the intake rack 12 of a water intake port 80 of a water use facility 82. The intake screen 16 is configured to collect debris transported by the water before the debris enters the intake port 80. The method includes a step of installing a track system 104 positioned proximate a portion of the intake rack 12 and aligned with the intake rack 12.

The track system includes two parallel tracks 106 with the path 108 of the track system 104 including at least one of a straight section 94 and a curved section 92. The track system 104 is aligned with the water facility 82 deck 18 or overhead support structure 32. The track system 104 typically include a curved section 92 at each end of the track system 104 to facilitate disposal of the collected debris.

A moveable support structure 22 is mounted on the track system 104 with the support structure 22 configured to move on the track system 104. The support system includes a track rake apparatus 19.

A drive mechanism 88 is installed on the moveable support structure 22 with the drive mechanism 88 including a drive bar 90, a drive motor 98, a drive pinion 100, and an encoder 104 coupled to the drive motor 98. The drive bar 90 defines a plurality of teeth 95 extending substantially the length of the drive bar 90 with the drive bar 90 disposed in an area defined by the parallel tracks 106 and extending substantially parallel to the tracks. In other words, if the track system 104 is in a straight line at one portion of the track system, the drive bar 90 is straight and parallel if the track system curves the drive bar will curve and maintain its parallel orientation between the track rails 106. The rack and pinion drive provides a more accurate drive mechanism for positioning the trash rake system at a water facility. The prior art chain drive system, over time, becomes less accurate because of slack in the chain. Such tension issues are not present in the present disclosure. In addition, the rack and pinion drive system is better at holding position along the track system in a wind storm than a chain drive of the existing systems.

The drive motor 98 is coupled to the drive pinion 100 with the drive pinion 100 configured to rotably engage the teeth 95 of the drive bar 90 along the entire length of the drive bar 90. The rotation of the drive pinion 100 along the drive bar 90 moves the support structure 22 on the tracks 106.

A controller 74 is installed and is coupled to the drive motor 98 and is configured to selectively position the moveable support structure 22 along the path 108 in response to a signal received from the encoder 102. The trash rake apparatus 19 is positioned proximate the intake rack 12 to remove debris from the intake screen 16. The controller 74 is typically programmed to operate the trash rake system 10 to move from an area at which trash is removed to an area where the trash is disposed.

In another embodiment, the method includes the step of providing a proximity sensor system 110. The proximity sensor system 110 includes installing a plurality of sensor targets 114, disposed parallel to the track system 104, between the two parallel tracks 106 at preselected locations. Each sensor target 112 is aligned on a different longitudinal line between the tracks 106. The proximity sensor system 110 further includes installing a plurality of proximity sensors 116 in an array 124 coupled to the controller 74 and the support structure 22. Each proximity sensor 116 is aligned to sense one of the sensor targets 112. Each of the proximity sensors 116 is configured to send a location signal to the controller 74.

In the embodiment that includes the proximity sensor system 110, the controller 74 is configured to compare the signal from the encoder 102 and the signal from one of the proximity sensors 116. If the signals are equal the controller 74 will operate the trash rake 19 to extend to a water depth associated with the preselected location on the path 108 of the track system 104. If the signals are not equal, the controller 74 will operate the trash rake 19 to extend to a default water depth. The controller 74 can also be configured to operate the trash rake system 10 automatically.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A rack and pinion drive for a trash rake system, the trash rake system used to clear debris from an intake screen of an intake rack of a water intake port of a water use facility, the intake screen configured to collect debris transported by the water before the debris enters the intake port, the trash rake system includes a track system having two parallel tracks including at least one of a straight section and a curved section, a movable support structure configured to move on the track system, the support structure including a trash rake apparatus, the rack and pinion drive comprising:
   a drive mechanism including a drive bar, a drive motor, a drive pinion attached to said drive motor, and an encoder coupled to the drive motor, with the drive bar defining a plurality of teeth extending substantially the length of the drive bar, with the drive bar disposed in the area defined by the parallel tracks and extending substantially parallel to the tracks, with the drive motor disposed in the movable support structure and mounted to a mounting plate, the mounting plate attached to said movable support structure and movable relative to the movable support structure such that, the mounting plate, the drive motor, and the drive pinion are movable relative to the parallel tracks in a direction which is perpendicular to a direction of travel of the movable support structure along a length of the parallel tracks of said track system, the drive motor coupled to the drive pinion, with the drive pinion configured to engage the teeth of the drive bar along the entire length of the drive bar, wherein rotation of the drive pinion along the drive bar moves the support structure on the tracks; and
   a controller coupled to the drive motor and configured to selectively position the movable support structure along the parallel tracks in response to a signal received from the encoder, wherein the trash rake apparatus is positioned proximate the intake rack to remove debris from the intake screen.

2. The rack and pinion drive for a trash rake system of claim 1, further including a proximity sensor system comprising:
   a plurality of sensor targets, disposed parallel to the track system, between the two parallel tracks at a preselected location, with each sensor target aligned on a different longitudinal line between the parallel tracks; and
   a plurality of proximity sensors coupled to the controller and the movable support structure with each proximity sensor aligned to sense one of the sensor targets, with each proximity sensor configured to send a location signal to the controller.

3. The rack and pinion drive for a trash rake system of claim 2 wherein the controller is configured to compare the signal from the encoder with the signal from one of the proximity sensors; and
   if the signals are equal, the controller will operate the trash rake to extend to a water depth associated with the preselected location on the path of the track system; and
if the signals are not equal the controller will operate the trash rake to extend to a default water depth.

4. The rack and pinion drive for a trash rake system of claim 3, with each sensor target associated with a specific water depth.

5. The rack and pinion drive for a trash rake system of claim 4, with each sensor target having a length representative of a distance along the track system associated with the specific water depth at that location along the track system.

6. The rack and pinion drive for a trash rake system of claim 1, further comprising a no-rake sensor extending from the movable support structure and aligned to sense a no-rake target disposed along the track system at a location not to be raked by the trash rake apparatus, with the no-rake sensor configured to send a location signal to the controller, with the controller configured to not operate the trash rake apparatus upon receipt of the location signal.

7. The rack and pinion drive for a trash rake system of claim 1, further comprising a cam follower coupled to the movable support structure, with the cam follower configured to apply a force against the drive bar opposite the drive pinion.

8. The rack and pinion drive for a trash rake system of claim 3, wherein the controller is configured to operate the trash rake system automatically.

9. The rack and pinion drive for a trash rake system of claim 1, further comprising a disposal area proximate the track system.

10. A trash rake system for use in clearing debris from an intake screen of an intake rack of a water intake port of a water use facility, the intake screen configured to collect debris transported by the water before the debris enters the intake port, the trash rake system comprising:
   a track system positioned proximate a portion of the intake rack and aligned with the intake rack, the track system including two parallel tracks, wherein a path of the track system includes at least one straight section and one curved section;
   a movable support structure configured to move on the track system, with the support structure including a trash rake apparatus;
   a drive mechanism including a drive bar, a drive motor, a drive pinion, and an encoder coupled to the drive motor, the drive bar defining a plurality of teeth extending substantially the length of the drive bar, with the drive bar located between the parallel tracks, spaced apart from each of the tracks, and extending substantially parallel to the tracks;

a drive motor disposed in the movable support structure and mounted to a mounting plate, the mounting plate attached to said movable support structure and movable relative to the movable support structure such that the mounting plate, the drive motor, and a drive pinion coupled to the drive motor are movable relative to the parallel tracks in a direction which is perpendicular to a direction of travel of the support structure along a length of the parallel tracks of said track system, with the drive pinion configured to rotably engage the teeth of the drive bar along the entire length of the drive bar, wherein rotation of the drive pinion along the drive bar moves the movable support structure on the tracks; and a controller coupled to the drive motor and configured to selectively position the movable support structure along the path in response to a signal received from the encoder, wherein the trash rake apparatus is positioned proximate the intake rack to remove debris from the intake screen.

11. The trash rake system for use in clearing debris from an intake screen of claim 10, further including a proximity sensor system comprising:

a plurality of sensor targets, disposed parallel to the track system, between the two parallel tracks at a preselected location, with each sensor target aligned on a different longitudinal line between the parallel tracks; and a plurality of proximity sensors coupled to the controller and the movable support structure with each proximity sensor aligned to sense one of the sensor targets, with each proximity sensor configured to send a location signal to the controller.

12. The trash rake system for use in clearing debris from an intake screen of claim 11, wherein the controller is configured to compare the signal from the encoder with the signal from one of the proximity sensors; and if the signals are equal, the controller will operate the trash rake to extend to a water depth associated with the preselected location on the path of the track system; and if the signals are not equal the controller will operate the trash rake to extend to a default water depth.

13. The trash rake system for use in clearing debris from an intake screen of claim 12, with each sensor target associated with a specific water depth.

14. The trash rake system for use in clearing debris from an intake screen of claim 13, with each sensor target having a length representative of a distance along the track system associated with the specific water depth at that location along the track system.

15. The trash rake system for use in clearing debris from an intake screen of claim 10, further comprising a no-rake sensor extending from the movable support structure and aligned to sense a no-rake target disposed along the track system at a location not to be raked by the trash rake apparatus, with the no-rake sensor configured to send a location signal to the controller, with the controller configured to not operate the trash rake apparatus upon receipt of the location signal.

16. The trash rake system for use in clearing debris from an intake screen of claim 10, further comprising a cam follower coupled to the movable support structure, with the cam follower configured to apply a force against the drive bar opposite the drive pinion.

17. The trash rake system for use in clearing debris from an intake screen of claim 12, wherein the controller is configured to operate the trash rake system automatically.

18. The trash rake system for use in clearing debris from an intake screen of claim 10, further comprising a disposal area proximate the track system.

19. A method for clearing debris from an intake screen of an intake rack of a water intake port of a water use facility, the intake screen configured to collect debris transported by the water before the debris enters the intake port, the method comprising:

installing a track system positioned proximate a portion of the intake rack and aligned with the intake rack, the track system including two parallel tracks, wherein a path of the track system includes at least one straight section and one curved section;

mounting a movable support structure on the track system, the support structure configured to move on the track system, with the movable support structure including a trash rake apparatus;

installing a drive mechanism on the movable support structure, with the drive mechanism including a drive bar, a drive motor, a drive pinion, and an encoder coupled to the drive motor, the drive bar defining a plurality of teeth extending substantially the length of the drive bar, with the drive bar disposed in an area defined by the parallel tracks and extending substantially parallel to the tracks, the drive motor is coupled to the drive pinion, with the drive pinion configured to rotably engage the teeth of the drive bar along the entire length of the drive bar, wherein rotation of the drive pinion along the drive bar moves the support structure on the tracks;

installing a controller coupled to the drive motor and configured to selectively position the movable support structure along the path in response to a signal received from the encoder, wherein the trash rake apparatus is positioned proximate the intake rack to remove debris from the intake screen; and wherein the step of installing the drive mechanism on the movable support structure includes mounting the drive mechanism to a movable mounting plate and attaching said movable mounting plate to said movable support structure with a linear bearing assembly such that the movable mounting plate is movable in a direction perpendicular to a direction of travel of the support structure along a length of the parallel tracks of said track system.

20. The method for clearing debris from an intake screen of claim 19, further including a step of providing a proximity sensor system comprising:

installing a plurality of sensor targets, disposed parallel to the track system, between the two parallel tracks at preselected locations, with each sensor target aligned on a different longitudinal line between the parallel tracks; and installing a plurality of proximity sensors coupled to the controller and support structure with each proximity sensor aligned to sense one of the sensor targets, with each of the proximity sensors configured to send a location signal to the controller.

21. The method for clearing debris from an intake screen of claim 20, including configuring the controller to compare the signal from the encoder with the signal from one of the proximity sensors; and if the signals are equal, the controller will operate the trash rake to extend to a water depth associated with the preselected location on the path of the track system; and if the signals are not equal the controller will operate the trash rake to extend to a default water depth.

22. The method for clearing debris from an intake screen of claim 21, wherein the controller is configured to operate the trash rake system automatically.

23. The method for clearing debris from an intake screen of claim 19, including moving the movable support structure to a disposal area proximate the track system.

* * * * *